1. United States Patent  
Kim et al.

(10) Patent No.: US 6,999,604 B1
(45) Date of Patent: Feb. 14, 2006

(54) APPARATUS AND METHOD FOR DETECTING A MOVING OBJECT IN A SEQUENCE OF COLOR FRAME IMAGES

(75) Inventors: Hyoung Gon Kim, Seoul (KR); Sang Chul Ahn, Seoul (KR); Nam Ho Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/744,250

(22) PCT Filed: Aug. 7, 1998

(86) PCT No.: PCT/KR98/00243

§ 371 (c)(1),
(2), (4) Date: Mar. 7, 2001

(87) PCT Pub. No.: WO00/08586

PCT Pub. Date: Feb. 17, 2000

(51) Int. Cl.
*G06K 9/00* (2006.01)
(52) U.S. Cl. .................................................. 382/107
(58) Field of Classification Search ................ 382/107, 382/118, 165, 190, 103, 162, 167, 236; 348/699, 348/169, 170
See application file for complete search history.

(56) References Cited

U.S. PATENT DOCUMENTS

| | | | | |
|---|---|---|---|---|
| 5,164,992 A | * | 11/1992 | Turk et al. | 382/118 |
| 5,909,249 A | * | 6/1999 | Sathe et al. | 375/240.18 |
| 6,148,092 A | * | 11/2000 | Qian | 382/118 |
| 6,292,575 B1 | * | 9/2001 | Bortolussi et al. | 382/118 |
| 6,493,041 B1 | * | 12/2002 | Hanko et al. | 348/699 |

* cited by examiner

*Primary Examiner*—Joseph Mancuso
*Assistant Examiner*—Tom Y. Lu
(74) *Attorney, Agent, or Firm*—Shlesinger, Arkwright & Garvey LLP

(57) ABSTRACT

An apparatus and method for detecting a moving object in a sequence of color frame images is provided. The apparatus comprises a color normalizer for normalizing color components of the color frame image to produce a normalized frame image; a color transformer coupled to the color normalizer for color transforming the normalized frame image to a color transformed frame image; the color transformed frame image having intensity levels such that colors corresponding to said moving object are emphasized; a frame delay coupled to the color transformer for delaying the color transformed frame image by one frame; and a motion detector coupled to the color transformer and the frame delay for detecting the motion of the moving object and further intensifying the intensity levels of the color transformed frame image based on the detected motion.

4 Claims, 5 Drawing Sheets

FIG. 5a
FIG. 5b
FIG. 5c
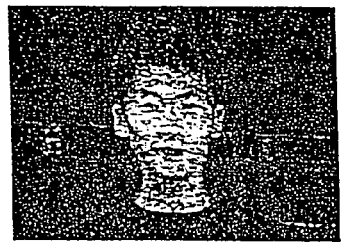
FIG. 6
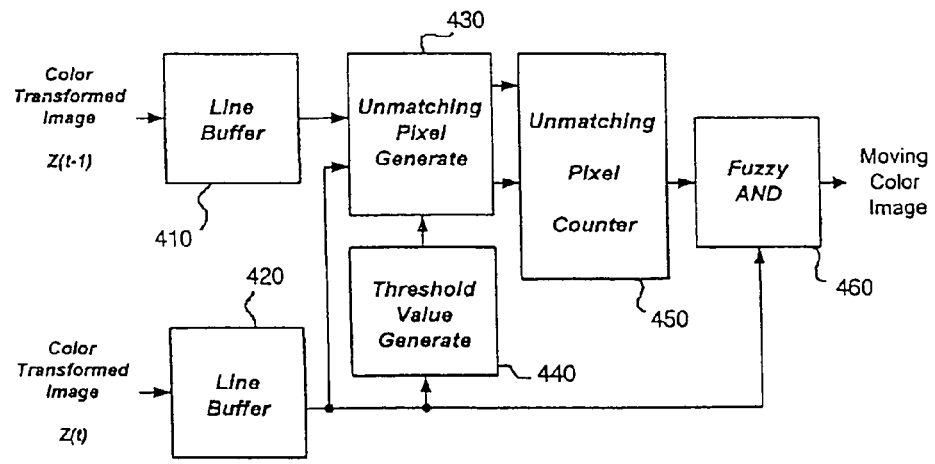

APPARATUS AND METHOD FOR DETECTING A MOVING OBJECT IN A SEQUENCE OF COLOR FRAME IMAGES

TECHNICAL FIELD

The present invention relates to an apparatus and method for detecting a moving object in a motion picture, and more specifically, to an apparatus and method for detecting a face region from a motion picture by using the color and motion information of the face region.

BACKGROUND ART

Detecting a face region from a motion picture is one of the prerequisite steps in face recognition. Conventional schemes for detecting a face region have not been used widely, since those schemes are affected by background images, and the size and orientation of the face.

Detection of face regions may be performed by using the information of the shape, color, or motion of the faces.

Using shape information for detecting a face region may be performed by measuring variation of gray levels and applying the measured values to a priori information of the face. However, the scheme should be applied only to images containing front side of a face, and the detection result is largely affected by background images, and the size and orientation of the face.

The scheme of using color information suffers from racial deviations of face colors, because the scheme detects a face region by using the inherent color of human faces. Further, the scheme requires large amount of data processing, since it uses much more information than the scheme of using shape information. However, it becomes more applicable than the scheme of using shape information, as hardware technology has recently developed.

The motion information may also be used for detecting face regions in motion pictures wherein an object, i.e. a face, is moving.

DISCLOSURE OF INVENTION

It is therefore a principal object of the invention to provide an apparatus and method for detecting a moving object wherein the detection is not affected by background images, and the size and orientation of the moving object.

It is another object of the invention to provide an apparatus and method for detecting a moving object including a face region wherein the detection may be performed faster than the prior art.

In accordance with one aspect of the present invention to achieve the aforementioned object, an apparatus for detecting a moving object in a sequence of color frame images is provided. The color frame images have a plurality of pixels, each having three color components. The apparatus comprises a color normalizer for normalizing color components of the color frame image to produce a normalized frame image, a color transformer coupled to the color normalizer for color transforming the normalized frame image to a first color transformed frame image, the first color transformed frame image having intensity levels such that pixels corresponding to said moving object are emphasized, a frame delay coupled to the color transformer for delaying the first color transformed frame image by one frame to produce a second color transformed frame image, and a motion detector coupled to the color transformer and the frame delay for detecting the motion of the moving object and further intensifying the intensity levels of the first color transformed frame image based on the detected motion.

BRIEF DESCRIPTION OF DRAWINGS

The present invention will become more apparent upon a detailed description of the best mode for carrying out the invention as rendered below. In the description to follow, references will be made to the accompanying drawings, where like reference numerals are used to identify like parts in the various views and in which:

FIG. 5 shows results of color transformation by using GFCD modeling of a typical face image;

FIG. 6 shows a block diagram of the motion detection block 400 of FIG. 1.

BEST MODE FOR CARRYING OUT THE INVENTION

Figure 1:
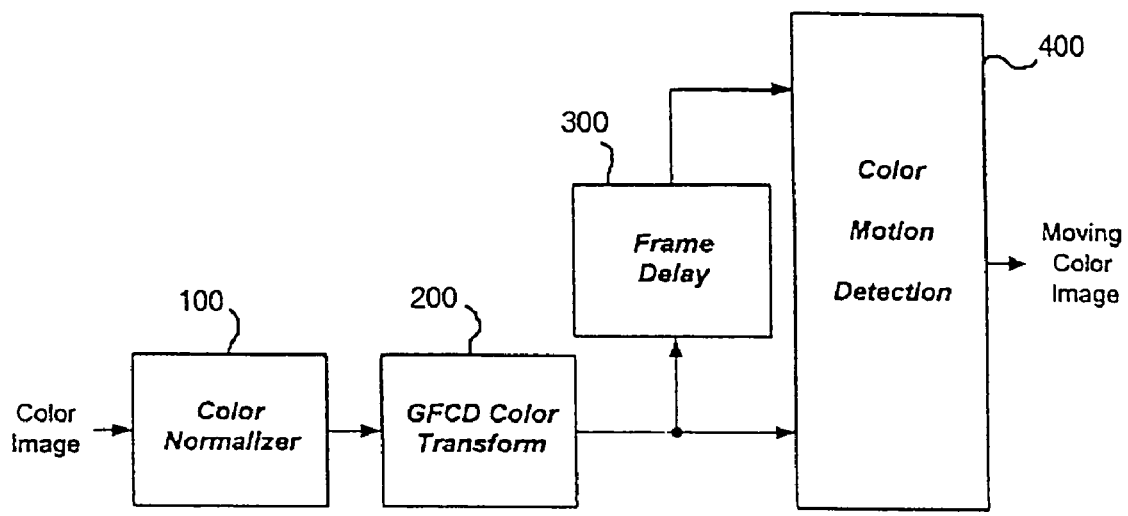
FIG. 1 shows a block diagram of the overall system for detecting a moving object in a color motion picture in accordance with the present invention.

FIG. 1 shows a block diagram for illustrating the overall system for detecting a moving object in a color motion picture in accordance with the present invention. The system comprises a color normalizer 100 for normalizing color components of a current frame image of the color motion picture; a color transformer 200 for color transforming the normalized frame image to a color transformed frame image; a frame delay 300 for temporarily storing the color transformed frame image from the color transformer 200 to delay the color transformed frame image by one frame; and a motion detector 400 for receiving the color transformed current and previous frame images from the color transformer 200 and the frame delay 300 and detecting the motion of the moving object. The color transformed frame image, which is produced by the color transformer, has intensity levels such that pixels corresponding to the moving object are emphasized. The motion detector 400 uses the detected motion of the moving objects to further intensify the intensity levels of pixels of the moving object.

Figure 2:
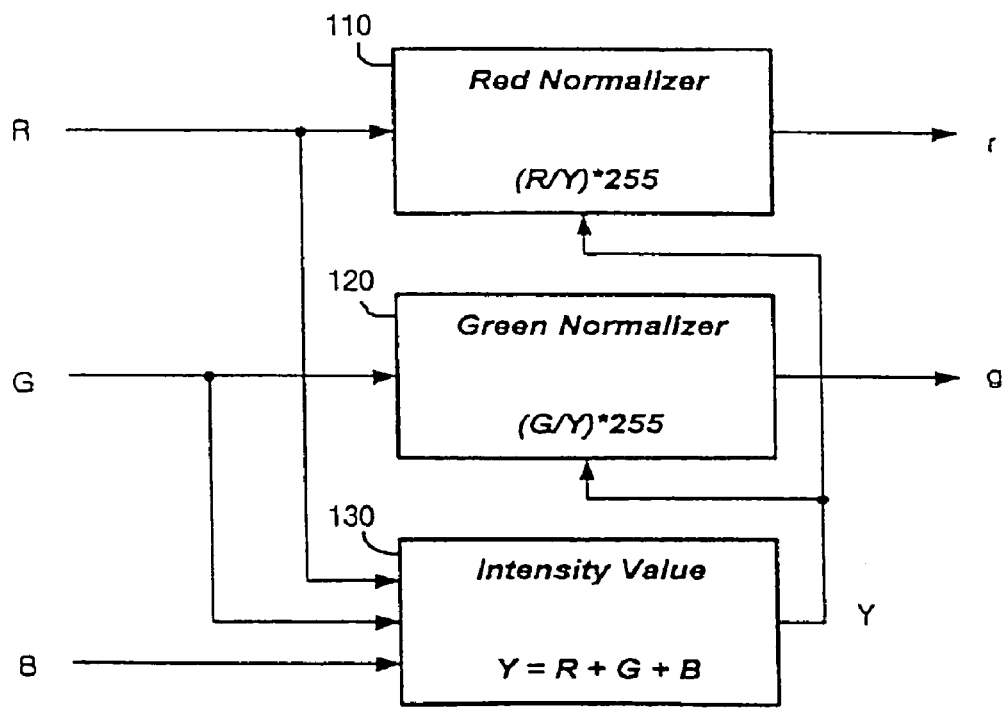
FIG. 2 shows a block diagram of the color normalizer 100 of FIG. 1.

Referring now to FIG. 2, the operation of the color normalizer 100 of FIG. 1 will be explained.

In color model of RGB color space, for example, any color information Q may be represented by three color components, i.e., red, green, and blue color components R, G, and B, having different wavelengths. In other words, the color information Q may be given by Q=(R, G, B). A luminance value Y may be defined by sum of the three color components. The luminance value Y is a measure of a visible radiant energy which produces the sensation of brightness. In order to prevent brightness of an image from affecting the color components of an image, the color components of each pixel must be normalized by luminance value Y of the pixel.

FIG. 2 shows a block diagram of the color normalizer 100. The color normalizer 100 comprises a luminance extractor 130, and two normalizers 110 and 120. The luminance extractor 130 evaluates a luminance value Y by summing red, green, and blue color components R, G, and B for each pixel of a frame image, i.e., Y=R+G+B, and outputs it. Then, the normalizer 110, for example, red component normalizer receives the Y values and outputs normalized color component r by using the luminance value Y and red color component R, wherein r is given by (R/Y)*255. Similarly, the normalizer 120, for example, green component normalizer receives the luminance value Y and outputs normalized color component g which is given by g=(R/Y)* 255. Hereinabove, we assumed that the luminance value has depth of 3 bits, and the most bright pixel has the luminance value of 255. By the normalization, any color information Q may be represented by two normalized color components r and g, i.e. Q=(r, g), since the three normalized color components r, g, and b has the relationship of r+g+b=255. In this way, the color model of the normalized color space can represents $256^2/2$ colors, while the color model of RGB color space represents $256^3$ colors.

Figure 3A:
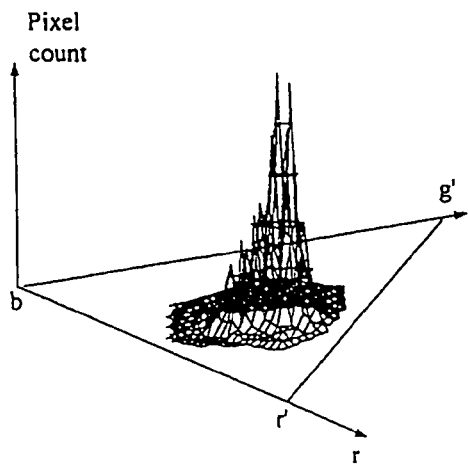
FIG. 3a shows a histogram of normalized color components in a typical face image.

FIG. 3a shows histogram of normalized color components in a typical face image. In FIG. 3a, two horizontal axis represents two normalized color component values r and g, and the vertical axis represents number of pixels having normalized color components of r and g in a typical face image. Distributions of the normalized color components are similar for all face images regardless of backgrounds and brightness.

Figure 3B:
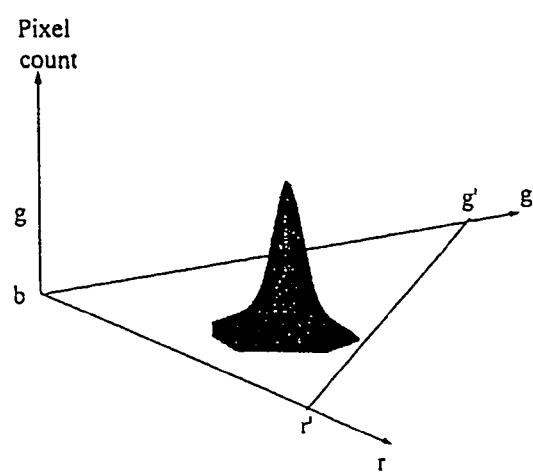
FIG. 3b shows a histogram of normalized color components in a face images modeled by using 2-dimensional Gaussian distribution function.

FIG. 3b shows histogram of normalized color components in face image which is modeled by 2-dimensional Gaussian distribution function. In this embodiment of the invention, the modeling is performed by using 2-dimensional Gaussian distribution as shown in FIG. 3b. The Gaussian model for color distribution in face images is called Generalized Face Color Distribution (GFCD). GFCD is defined by mean m and variance $\Sigma^2$, in other words, GFCD is represented by $GF(m, \Sigma^2)$. In this representation, m=(/r, /g) is the center point of the 2-dimensional Gaussian distribution, wherein /r and /g are mean values of normalized color components for all pixels in a face image. $\Sigma^2$ represents a covariance matrix of normalized color components in a face image. In a preferred embodiment, a GFCD for face images may have m=(105, 95) and $\Sigma^2$ of $\sigma_r$=20 and $\sigma_g$=15. By using the GFCD model, an input color image containing a face may be transformed to a gray-level image where pixels having color of the face are emphasized.

The color transformation using a color distribution model transforms normalized color components of pixels to values which represent the proximity of the color components to the mean m=(/r, /g) of the Gaussian distribution in the normalized color space. The color transformation is defined as follows:

$$f: R^2 \rightarrow R^1 \quad \text{Eq. 1}$$

$$Z(x, y) = GF(r(x, y), g(x, y)) \quad (x, y) \in 1$$

wherein (x, y) is a coordinate of a pixel in the face image, g(x, y) and r(x, y) are normalized color components of the pixel at the coordinate (x, y), and GF( ) is Generalized Face Color Distribution function. The color transformation using GFCD produces values which are proportional to the proximity of the color of the pixel to a human face color.

Figure 4:
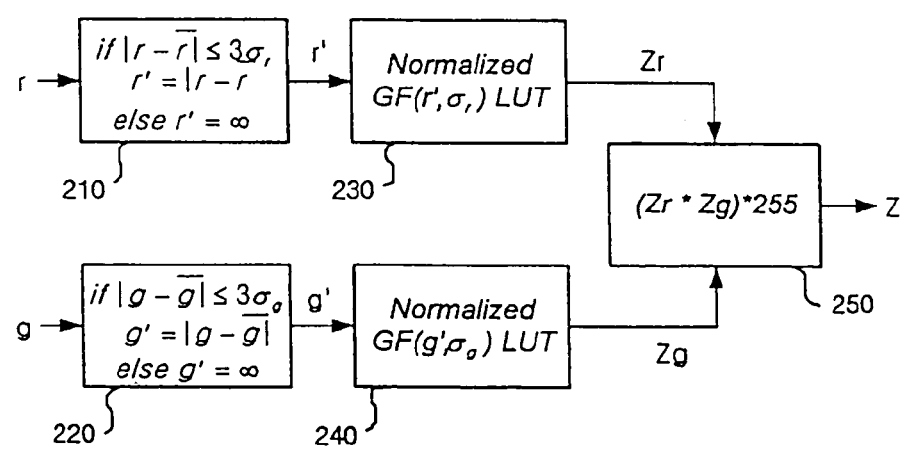
FIG. 4 shows a block diagram of the color transformer 200 of FIG. 1.
Figure 7A:
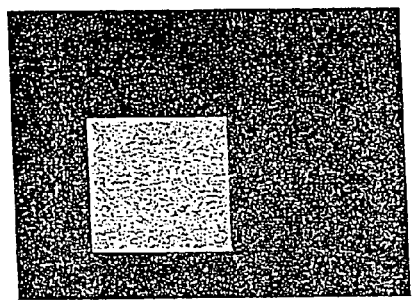
FIG. 7 shows motion detection results of two successive images which have a rectangular object.
Figure 7B:
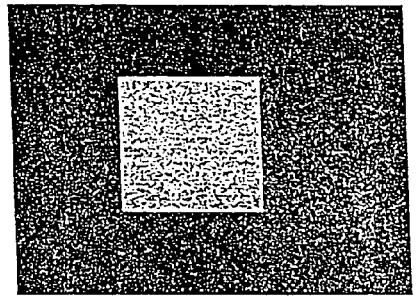
Figure 7C:
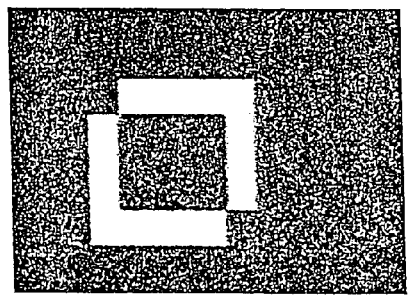
Figure 7D:
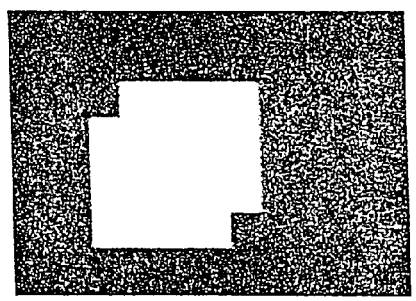
Figure 7E:
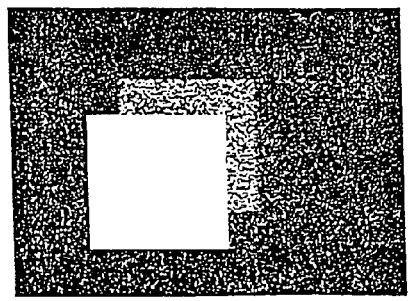
Figure 7F:
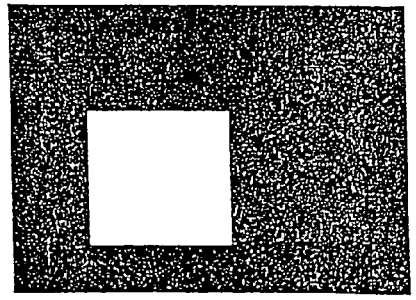
Figure 8A:
FIG. 8 shows motion detection results of two successive images having a human face.
Figure 8B:
Figure 8C:
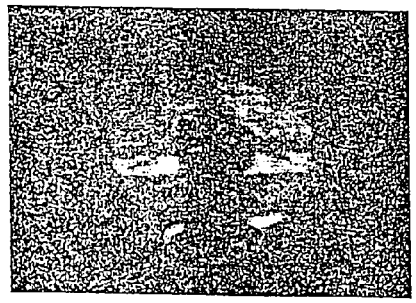
Figure 8D:
Figure 8E:
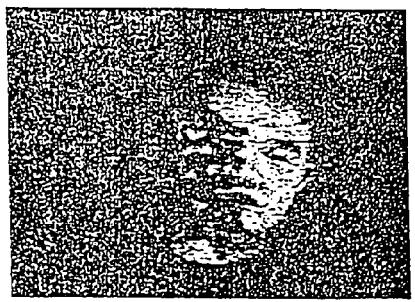
Figure 8F:
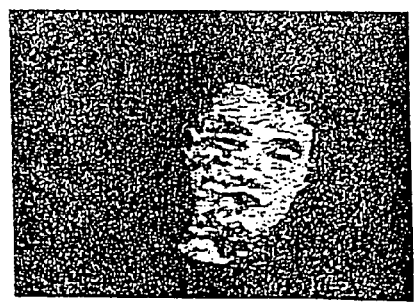

Referring to FIGS. 4 and 5, the operation of the color transformers 200 of FIG. 1 will be explained.

FIG. 4 shows a block diagram of the color transformer 200. Color transformer 200 comprises blocks 210 and 220, two normalization block 230 and 240, and output block 250. Block 210 receives the normalized color component r from the normalizer 110 and compares it with $\sigma_r$ which is predetermined in accordance with a particular GFCD model. If the normalized color component r is within three times of $\sigma_r$ around /r, then, the block 210 outputs r'=|r−/r|. Otherwise, the block 210 outputs a very large value in order to make Zr=0. Blocks 230 receives the output value r' and outputs transformed value Zr by referring to a look-up table LUT which contains 1-dimensional normalized Gaussian number GF(0, $\sigma_r^2$) Similarly, block 220 receives the normalized color component g and compares it with $\sigma_g$. If the normalized color component g is within three times of $\sigma_g$ around /g, then, the block 220 outputs g'=|g−/g|. Otherwise, the block 220 outputs a very large value in order to make Zg=0. The block 240 receives the output value g' and outputs transformed value Zg by referring to a look-up table LUT which contains 1-dimensional normalized Gaussian number GF(0, $\sigma_g^2$). Output block 250 receives Zr and Zg values and evaluates Z=(Zr*Zg)*255 and outputs Z. FIG. 5 shows results of color transformation by using GFCD modeling of a typical face image. As can be seen in the result image of FIG. 5, areas having human face color are emphasized.

If any background images have color which is similar to the color of human face, the above method may emphasize those background images as well as face area. In order to overcome this problem, the present method uses motion information of human face. In general, only the human face area is moving while background images remain still. Thus, the human face area may be outstandingly distinguished from background images, if motion information of the face area is utilized.

Two methods for extracting motion information from two successive frame images are well known in the art. They are region based method and feature point based method. Most applications in the art use the region based method rather than the feature point based method, since the latter generally requires post-processing which uses interpolation technique.

In a typical region based method, the inter-frame differences of intensity levels of pixels adjacent a particular pixel are summed in order to measure the motion of the particular pixel. This method is known as Accumulated Difference Measure (ADM) method. Since the ADM method uses the summation of intensity differences of neighbor pixels, it detects a motion robustly against small noisy change of neighbor pixels. However, pixels having small differences are ignored by averaging effect, and the measurements are largely affected by the determination of threshold value.

Thus, the present invention preferably performs motion detection by counting pixels whose inter-frame differences are larger than a threshold value in a window having predetermined size. This motion detection measure will be called Unmatching Pixel Count (UPC) measure and may be written as follows:

$$UPC(x, y, t) = \sum_{i=x-N}^{i=x+N} \sum_{j=y-N}^{j=y+N} U(i, j, t) \quad \text{Eq. 2}$$

-continued $$U(i, j, t) = \begin{cases} 1, & \text{if } |Z(i, j, t) - Z(i, j, t-1)| > Th \\ 0, & \text{otherwise} \end{cases}$$

wherein Th is a threshold value for determining whether the intensity values of pixels in two successive frame images are matched. In the UPC method, since matching is tested in a pixel by pixel manner and the results are accumulated, the averaging effect is reduced such that overlapping area causing a small intensity change is clearly captured.

In order to detect motion of a color image, the color information explained hereinabove may be used. It may be recognized by those skilled in the art that the intensity level of each pixel in the color transformed image, which was transformed by using the color transformation method of GFCD modelling, represents a probability that the pixel is in a face area. The color information of the color transformed image may be incorporated in Eq. 2 by weighting the counts with the intensity level of the pixel of the color transformed image. This new motion detection measure will be referred to as Weighted Unmatching Pixel Count (WUPC). The WUPC(x, y, t) is evaluated by performing fuzzy-AND operation between the UPC measure UPC(x, y, t) and the intensity level of the color transformed image Z(x, y, t). The WUPC measure is given by following equation:

$$WUPC(x, y, t) = Z(x, y, t) \otimes \sum_{i=x-N}^{i=x+N} \sum_{j=y-N}^{j=y+N} U(i, j, t) \qquad \text{Eq. 3}$$

$$U(i, j, t) = \begin{cases} 1, & \text{if } |Z(i, j, t) - Z(i, j, t-1)| > Th \\ 0, & \text{otherwise} \end{cases}$$

wherein the operator $\otimes$ is fuzzy-AND operator. This WUPC measure emphasizes motion of the pixels having color which is similar to color of a human face, while deemphasizing motion of the other pixels, i.e., pixels of background images.

In Eq. 3, the threshold value Th may be obtained adaptively by using the transformed image value Z(x, y, t) for each pixel. In other words, the Th becomes small for pixels which are in a face area and large for other pixels. In this way, the WUPC measure is more sensitive to motion of pixels in a face area than motion of the other pixels, such that even small motion of face area may be detected. In a preferred embodiment of the present invention, the threshold Th may be obtained by using Sigmoid function as follows: Slope of Sigmoid function becomes steep as Q is lowered. Thus, Sigmoid $$Th(Z) = \frac{255}{1 + e^{\frac{Z(x,y,t) - 255/2}{Q}}} \qquad \text{Eq. 4}$$

function is a lot like a step-function shape for small Q. It is appropriate to use Sigmoid function as a function for determining threshold Th of Eq. 3, since the Sigmoid function outputs small threshold Th for a large input value and large Th for small input value. Further, the Sigmoid function is nonlinear in that the function does not respond abruptly to maximum or minimum input values. This method for adaptively counting unmatched pixels will be called Adaptive Weighted Unmatching Pixel Count (AWUPC) measure.

FIG. 6 shows a block diagram of the motion detection block 400 of FIG. 1. The motion detection block 400 comprises line buffers 410 and 420 for temporarily storing color transformed images and outputting intensity levels of pixels in a window of a predetermined size; an adaptive threshold value generator 440 for generating threshold th in response to intensity level of a central pixel in the window; an unmatching pixel value generator 430 for receiving the threshold Th and present and previous frames of the color transformed image from line buffers 410 and 420 to determine whether the pixels in the window of the present frame match with the pixels in the window of the previous frame by evaluating unmatching pixel value U(x, y, t) of Eq. 3; an unmatching pixel counter 450 for counting the pixels which are determined to be unmatching pixels in the unmatching pixel generator 430; and a fuzzy-AND operator 460 for performing fuzzy-AND operation on the outputs of the unmatching pixel counter 450 with the intensity level Z(x, y, t) of the pixel of the color transformed image from the line buffer 420. The line buffer 420 outputs intensity level Z(i, j, t) in a window of the present frame, while the line buffer 410 outputs intensity level Z(i, j, t−1) in a window of the previous frame of the color transformed image. The window size is (2N+1)×(2N+1) such that the line buffers 410 and 420 output intensity levels of (2N+1)×(2N+1) pixels. The threshold value generator 440 receives the intensity level of the central pixel Z(x, y, t) among the window of the present frame and evaluates a threshold value Th according to Eq. 4. The unmatching pixel generator 430 receives outputs from the line buffers 410 and threshold value Th from the threshold value generator 440. Then, the unmatching pixel generator 430 evaluates the u(i, j, t) of Eq. 3 for a central pixel Z(x, y, t) of the window. The unmatching pixel counter 450 receives the outputs of the unmatching pixel generator 430 and counts the number of unmatching pixels. The fuzzy-AND operator 460 outputs a color motion information by performing a fuzzy-AND operation between the intensity level of the central pixel Z(x, y, t) from the line buffer 420 and the outputs from the unmatching pixel counter 450.

Referring to FIGS. 7 and 8, motion detection results of the present invention will be compared with those of the prior art. FIG. 7 shows motion detection results of two successive images which have a rectangular object. FIG. 7a shows the first images having a rectangular object with background images. Pixels in the rectangular object of FIG. 7a have random gray levels of 200–230, while the gray levels of pixels in the background images are random values of 0–30. FIG. 7b shows the second image wherein the rectangular object is moved by 50 pixels in x and y directions. FIG. 7c shows the motion detection results according to the conventional ADM method. The areas, whose inter-frame differences of intensity levels are large, are emphasized. However, those areas where the rectangular objects of the two subsequent images are overlapped are not emphasized. Thus, the motion is not well detected by the conventional ADM method when the two objects of sebsequent frmes are overlapped. FIG. 7d shows a motion detection result according to the UPC measure. In FIG. 7d, those areas where the rectangular objects of the two subsequent images are overlapped are also emphasized. The UPC measure can detect motion of a moving object better than the ADM method, since it is able to detect overlapping areas of a moving object. FIG. 7e shows motion detection result according to the WUPC measure. The areas of the moving object having a desired color in the first image are emphasized. FIG. 7f shows the motion detection results by using AWUPC measure according to the present invention. FIG. 8 shows motion detection results of two successive images having a human face. FIG. 8a shows GFCD color transformed image of the first images having a human face with background images. FIG. 8b shows GFCD color transformed image of the second image wherein the human face is moved slightly. FIG. 8c shows the motion detection results according to the conventional ADM method. The motion is not well detected by the conventional ADM method as shown in FIG. 8c. FIG. 8d shows a motion detection result according to the UPC measure. FIGS. 8e and 8f respectively show motion detection result according to the WUPC measure and AWUPC measure in accordance with the present invention.

What is claimed is:

1. An apparatus for detecting a moving object in a sequence of color frame images, said color frame images having a plurality of pixels, each pixel having three color components, comprising:

a color normalizer for normalizing color components of each color frame image to produce a normalized color frame image;

a color transformer coupled to said color normalizer for color transforming said normalized color frame image to a first color transformed frame image, said first color transformed frame image having intensity levels such that pixels corresponding to said moving object are emphasized;

a frame delay coupled to said color transformer for delaying said first color transformed frame image by one frame, said delayed first color transformed frame image being a second color transformed frame image;

a motion detector coupled to said color transformer and said frame delay for detecting the motion of the moving object and further intensifying the intensity levels of said first color transformed frame image based on the detected motion; and the intensity level of said each pixel of said first color transformed frame image and the normalized color components of the pixel has a relationship as follows:

$$Z(x,y)=GF(r(x,y),g(x,y))(x,y)\epsilon 1$$

where (x,y) is a coordinate of said pixel in said normalized frame image, $Z(x,y)$ is the intensity level of said pixel of said first color transformed frame image at the coordinate (x,y), $r(x,y)$ and $g(x,y)$ are normalized color components of said pixel at the coordinate (x,y), and GF( ) is a 2-dimensional Gaussian distribution function.

2. The apparatus of claim 1, wherein:

said motion detector comprises means for detecting the motion of each pixel by counting pixels adjacent said each pixel whose intensity level differences between said first and second color transformed frame images are larger than a threshold value; and said intensity level of each pixel is further intensified by weighting said intensity level in accordance with said detected motion of said each pixel.

3. The apparatus of claim 2, wherein said weighting is performed by fuzzy-AND operating said intensity level with said detected motion for said each pixel.

4. The apparatus of claim 2, wherein said threshold value is obtained by using a Sigmoid function as follows:

$$Th(Z) = \frac{255}{1+e^{\frac{z(x,y,t)-255/2}{Q}}}$$

wherein $Z(x,y,t)$ is the intensity level of a pixel and Q is a predetermined parameter.

* * * * *